United States Patent
Maehara

(10) Patent No.: US 7,490,703 B2
(45) Date of Patent: Feb. 17, 2009

(54) DISC BRAKE ACTUATING APPARATUS WITH PARKING-BRAKE OPERATING MECHANISM

(75) Inventor: Toshifumi Maehara, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 140 days.

(21) Appl. No.: 11/295,484

(22) Filed: Dec. 7, 2005

(65) Prior Publication Data

US 2006/0124407 A1   Jun. 15, 2006

(30) Foreign Application Priority Data

Dec. 9, 2004   (JP)   .................. P. 2004-357237

(51) Int. Cl.
*F16D 55/26* (2006.01)
*F16D 65/14* (2006.01)

(52) U.S. Cl. ............. 188/72.6; 188/72.7; 188/72.8; 188/72.9; 188/71.9

(58) Field of Classification Search ....... 188/72.6–72.9, 188/71.9
See application file for complete search history.

(56) References Cited

U.S. PATENT DOCUMENTS

| | | | | |
|---|---|---|---|---|
| 4,109,765 A | 8/1978 | Johannesen | ................ | 188/72.7 |
| 4,544,045 A | 10/1985 | Runkle | ..................... | 188/72.6 |
| 4,635,761 A * | 1/1987 | Smith et al. | ................ | 188/72.6 |
| 6,311,807 B1 * | 11/2001 | Rinsma | ..................... | 188/71.9 |
| 2002/0079172 A1 * | 6/2002 | Shaw et al. | ................ | 188/72.1 |

FOREIGN PATENT DOCUMENTS

| | | |
|---|---|---|
| CN | 86 1 03957 A | 2/1987 |
| GB | 2 155 126 A | 9/1985 |
| JP | A-60-065920 | 4/1985 |
| JP | 2004-239331 | 8/2004 |

* cited by examiner

*Primary Examiner*—Robert A Siconolfi
*Assistant Examiner*—Mahbubur Rashid
(74) *Attorney, Agent, or Firm*—Morgan, Lewis & Bockius LLP

(57) ABSTRACT

A parking-brake operating mechanism is provided with an adjusting spindle, a cam shaft to which a parking lever is connected, and a thrust transmitting assembly disposed between the cam shaft and the adjusting spindle. The thrust transmitting assembly includes a rolling roller which can roll between the cam shaft and the adjusting spindle. Rolling curved surfaces are provided respectively at the cam shaft and the adjusting spindle. The rolling roller is disposed in contact with the rolling curved surfaces.

9 Claims, 12 Drawing Sheets

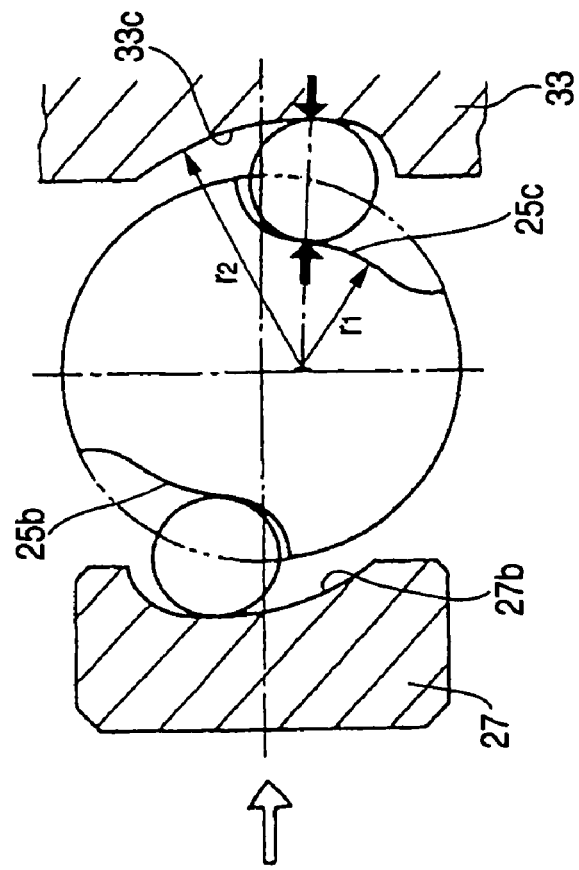
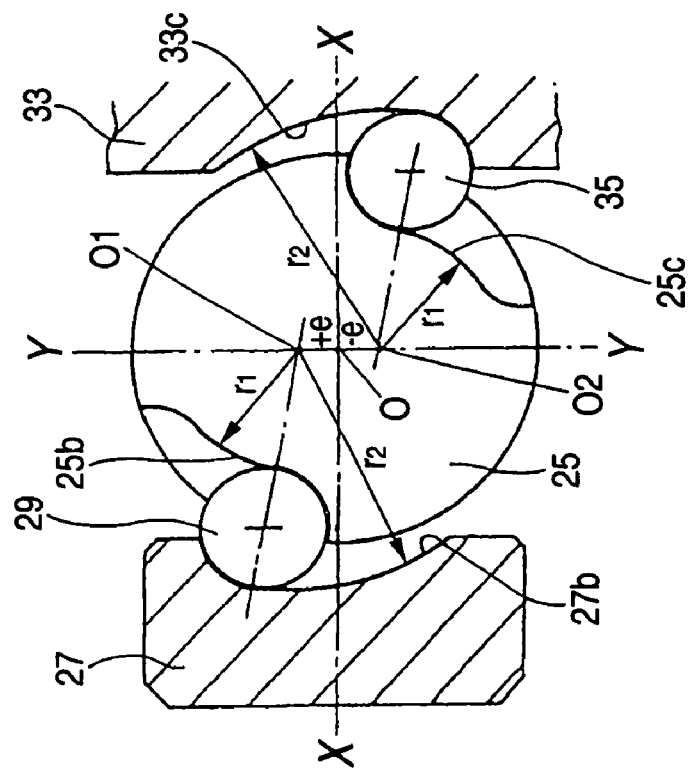

(INITIAL CONDITION)

(CAM SHAFT IS ANGULARLY MOVED 10°)

(CAM SHAFT IS ANGULARLY MOVED 30°)

(CAM SHAFT IS ANGULARLY MOVED 20°)

DISC BRAKE ACTUATING APPARATUS WITH PARKING-BRAKE OPERATING MECHANISM

The present application claims foreign priority based on Japanese Patent Application No. P.2004-357237, filed on Dec. 9, 2004, the contents of which are incorporated herein by reference.

BACKGROUND OF THE INVENTION

1. Field of the Invention

The present invention relates to a disc brake actuating apparatus having a parking-brake operating mechanism provided at one end portion of a caliper slidably supporting a piston containing an adjuster mechanism.

2. Related Art

As conventional parking-brake operating mechanisms of a disc brake actuating apparatus, there are known the type employing toggle links, the type employing a ball ramp and the type employing a cam. In any of these types, however, it is difficult to obtain a high boost ratio within the range of an allowable brake lever stroke. In order to obtain high boost ratio with a limited brake lever stroke, JP-A-60-065920 discloses a parking-brake operating mechanism in which toggle links are arranged symmetrically with respect to a point. Further, a type of parking-brake operating mechanism in which an inclination of a ramp surface in a ball ramp is made non-linear is also known.

FIG. 13 is a cross-sectional view of a portion of a parking-brake operating mechanism disclosed in JP-A-60-065920. When a parking lever 1 is driven to be pivotally moved in a direction of an arrow, a cam shaft 2, provided at one end of the parking lever 1, is angularly moved, and one toggle link 3 (which is one of the two toggle links arranged symmetrically with respect to a point) moves or pushes out an adjusting spindle 4 in a left-hand direction to operate a brake piston (not shown), and at the same time the other toggle link 5 is moved or pushed out in a right-hand direction to operate a caliper 6, so that a pair of brake pads are pressed respectively against opposite sides of a brake disc with a high boost ratio, thereby effecting a braking operation. By sliding holes 6a and 6a which are formed within the caliper 6, and have width across flats, the cam shaft 2 is supported for movement in a direction parallel to an axis of the adjusting spindle 4, and therefore a rotational frictional resistance of the cam shaft 2 can be reduced, and therefore this construction has been effective.

However, in the parking-brake operating mechanism employing such toggle links, sliding holes 6b and 6b for the sliding movement of the adjusting spindle 4, as well as the sliding holes 6a and 6a (which have the width across flats spaced from each other in a direction perpendicular to the adjusting spindle 4) for the sliding movement of the cam shaft 2, must be formed within the caliper 6. The formation of the sliding holes 6a (having the width across flats for the cam shaft 2) by grinding from the outside of the caliper 6 (This process is separate from a process of forming the sliding holes 6b) has been relatively difficult from the viewpoint of a machining technique, and has required much time. And besides, although the toggle link 3 is slidably supported between the cam shaft 2 and the adjusting spindle 4 while the toggle link 5 is slidably supported between the cam shaft 2 and the caliper 6, a frictional resistance of a contact portion of each toggle link increases when an axial thrust increases, and this has led to a power transmission loss.

SUMMARY OF THE INVENTION

One or more embodiments of the present invention provide a disc brake actuating apparatus provided with a parking-brake operating mechanism which can reduce a rotational frictional resistance of a cam shaft, and can suppress a power transmission loss even when an axial thrust increases, and can impart a braking force of a high boost ratio.

In accordance with one or more embodiments of the present invention, a disc brake actuating apparatus is provided with: a caliper; a piston slidably supported by the caliper and containing an adjuster mechanism; and a parking-brake operating mechanism provided at one end portion of the caliper. In the apparatus, the parking-brake operating mechanism includes: an adjusting spindle of the adjuster mechanism; a cam shaft disposed perpendicularly to the adjusting spindle; a parking lever connected to one end of the cam shaft; and a thrust transmitting assembly disposed between the cam shaft and the adjusting spindle, in which the thrust transmitting assembly transmits an axial thrust to the adjusting spindle when the cam shaft is angularly moved. In the apparatus, the thrust transmitting assembly includes: a rolling roller that rolls between the cam shaft and the adjusting spindle, while the rolling roller rotates about its axis; and rolling curved surfaces provided respectively at the cam shaft and the adjusting spindle, in which the rolling roller is disposed in contact with the rolling curved surfaces.

According to this structure, with a combination of the rolling roller and the rolling curved surfaces, a braking force of a high boost ratio can be applied in a stable manner, and besides thanks to the provision of the rolling roller which while rotating about its axis, can roll between the cam shaft and the adjusting spindle, a power transmission loss can be suppressed even when the axial thrust increases.

In addition, in accordance with one or more embodiments of the present invention, the disc brake actuating apparatus may further be provided with: a second thrust transmitting assembly provided between a side of the cam shaft facing away from a rotor and the caliper; and a second rolling roller of the second thrust transmitting assembly that rolls between second rolling curved surfaces provided respectively at the cam shaft and the caliper, while the second rolling roller rotates about its axis.

According to this structure, the second thrust transmitting assembly is provided between the second rolling curved surfaces provided respectively at that side of the cam shaft facing away from the rotor, and the caliper. Therefore a longer piston stroke can be secured.

In addition, in accordance with one or more embodiments of the present invention, a center of curvature of the rolling curved surface of the cam shaft may be spaced a predetermined distance from an axis of the cam shaft.

According to this structure, the center of curvature of the rolling curved surface, formed on the cam shaft, is spaced the predetermined distance from the axis of the cam shaft. Therefore the amount of the piston stroke relative to the amount of angular movement of the cam shaft can be set to an arbitrary value.

In addition, in accordance with one or more embodiments of the present invention, a center of curvature of the rolling curved surface provided at the adjusting spindle maybe disposed close to a center of curvature of the rolling curved surface on the cam shaft, and a center of curvature of the second rolling curved surface provided at the caliper may be disposed close to a center of curvature of the second rolling curved surface formed on the cam shaft.

According to this structure, the center of curvature of each of the rolling curved surface and the second rolling curved surface, provided respectively at the adjusting spindle and the caliper, is disposed close to the center of curvature of the corresponding rolling curved surface formed on the cam shaft. Therefore lines, which are normal respectively to each mating pair of curved rolling surfaces of the cam shaft and the adjusting spindle (or the caliper), and pass through the corresponding rolling roller, generally coincide with each other, and therefore the braking force is effectively transmitted.

In addition, in accordance with one or more embodiments of the present invention, the rolling curved surface provided at the adjusting spindle may be formed with a straight portion provided in an area corresponding to a stroke of an initial rotation of the cam shaft, and the second rolling curved surface provided at the caliper may be formed with a second straight portion provided in the area corresponding to the stroke of the initial rotation of the cam shaft.

According to this structure, it is possible to rapidly generate a stroke of the parking-brake operating mechanism at an initial timing of the rotation of the cam shaft. Moreover, a stroke amount in the axial direction in the initial timing of the rotation of the cam shaft can be increased.

In addition, in accordance with one or more embodiments of the present invention, the disc brake actuating apparatus may be further provided with a curved surface member mounted on the adjusting spindle, and the rolling curved surface provided at the adjusting spindle is formed on the curved surface member. Moreover, another curved surface member may be mounted on the caliper, and the second rolling curved surface provided at the caliper is formed on the curved surface member.

According to this structure, the rolling curved surface and the second rolling curved surface do not need to be formed on the adjusting spindle and the caliper by machining or the like. Therefore, a material which is lightweight and excellent in processability can be selected for the adjusting spindle and the caliper. Moreover, a material with excellent wear resistance can be used only for the curved surface members.

In addition, in accordance with one or more embodiments of the present invention, the disc brake actuating apparatus may further be provided with: a cylindrical hole having an axis extending in a direction of an axis of the adjusting spindle; an insertion port has an axis perpendicular to the axis of the cylindrical hole; and a guide member fixedly mounted within the cylindrical hole, and the cam shaft is inserted through the insertion port and slidably supported by the guide member.

According to this structure, there is provided the guide member separate from the caliper. Therefore, it is not necessary to form sliding holes (having width across flats) in the caliper.

In addition, in accordance with one or more embodiments of the present invention, the cam shaft may be slidably supported in a pair of notch grooves formed in a cylindrical portion of the guide member.

According to this structure, each of the notch grooves can be so formed as to have a width corresponding to the diameter of the cam shaft. Therefore, a plurality of kinds of cam shafts of different diameters can be used.

And besides, the position of each notch groove in the guide member can be freely set, and therefore the axis of the adjusting spindle and the axis of the cam shaft do not need to be disposed in a common plane, so that the degree of freedom of the design is high.

In addition, in accordance with one or more embodiments of the present invention, the disc brake actuating apparatus may further be provided with: a dust boot is provided between the insertion port and the cam shaft; and a parking lever guide, provided at the one side of the cam shaft, for preventing the parking lever from being tilted, and the dust boot is retained by the parking lever guide.

According to this structure, the dust boot is retained, using the parking lever guide which functions to prevent the tilting of the parking lever. Therefore the number of the component parts can be reduced.

In addition, in accordance with one or more embodiments of the present invention, a housing may be provided and connected to a side of the caliper remote from the rotor, and the adjusting spindle, the thrust transmitting assembly and the cam shaft may be assembled together in a generally unitary manner within the housing.

According to this structure, the adjusting spindle, the thrust transmitting assembly and the cam shaft can be beforehand assembled together within the housing. And besides, by removing the housing from the caliper, the parts can be easily disassembled.

Other aspects and advantages of the invention will be apparent from the following description and the appended claims.

BRIEF DESCRIPTION OF THE DRAWINGS

FIG. 5A is an explanatory view of the structure and operation of thrust transmitting assemblies, showing an initial position of the cam shaft before the brake is operated.

FIG. 5B is an explanatory view of the structure and operation of thrust transmitting assemblies, showing a brake operative position where the cam shaft is angularly moved through an angle of about 10 degrees from the initial position.

DESCRIPTION OF THE PREFERRED EMBODIMENTS

Embodiments of the invention will be described with reference to the accompanying drawings.

Figure 1:
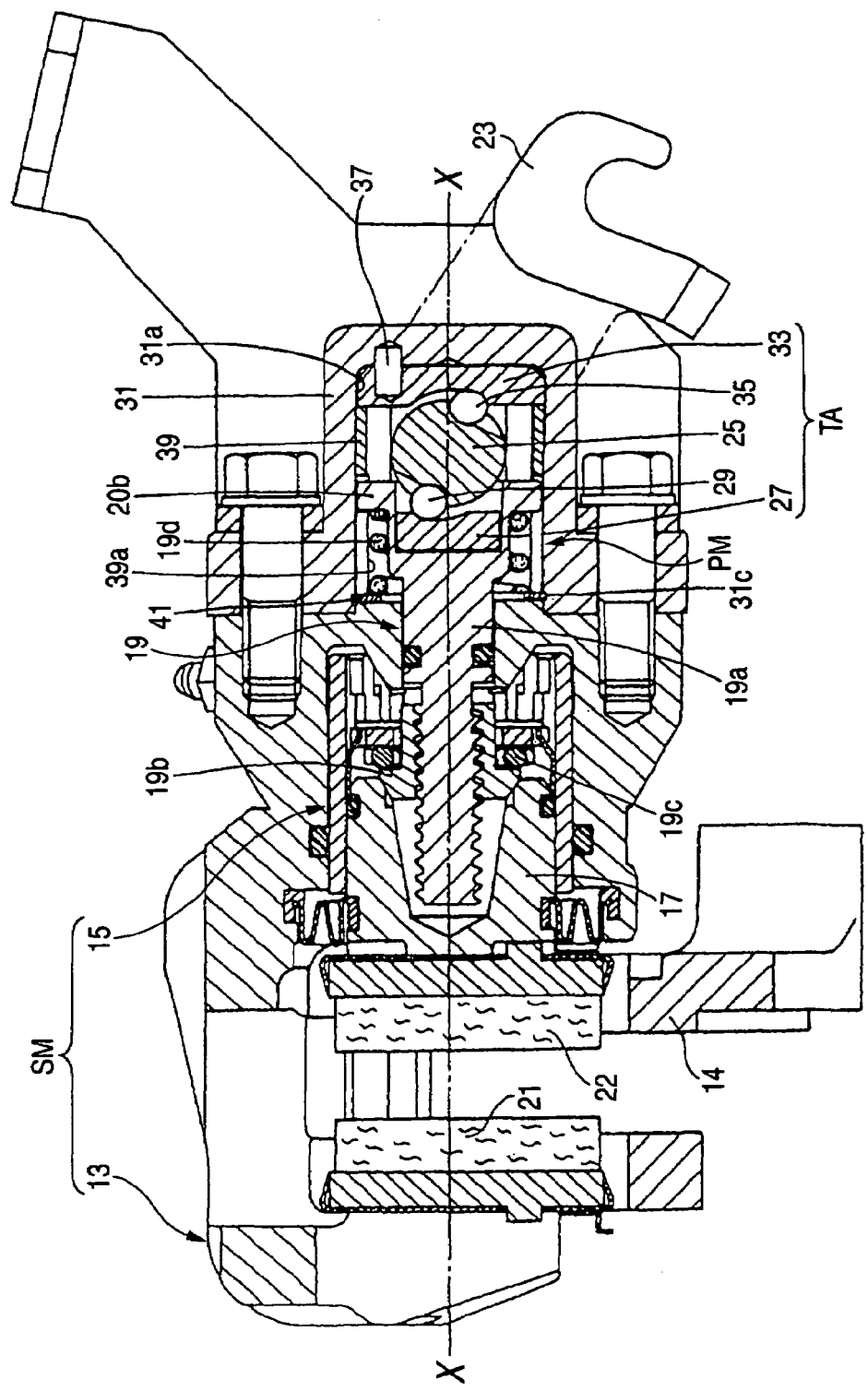
FIG. 1 is a cross-sectional view of an important portion of a first embodiment of a disc brake actuating apparatus of the invention provided with a parking-brake operating mechanism.

As shown in FIG. 1, a disc brake actuating apparatus of the invention provided with a fluid-operated service brake mechanism (SM) including a caliper 13 and a piston assembly 15, and the parking-brake operating mechanism (PM). The piston assembly 15 comprises a piston 17 which receives a fluid pressure to slide within the caliper 13 upon application of service braking, and an adjuster assembly 19 for compensating for wear of brake pads and also for preventing excessive adjustment. The caliper 13 is slidably supported on a fixed support member 14.

The adjuster assembly 19, used here, is of the known reversible screw type. This reversible screw-type adjuster includes the adjusting spindle 19a having a reversible screw, an adjusting sleeve 19b threaded on the spindle 19a, a bearing 19c for supporting the angular movement of the adjusting sleeve 19b, and a spring 19d. When wear of the brake pads 21 and 22 exceeds a predetermined level, the adjusting sleeve 19b is angularly moved relative to the adjusting spindle 19a to advance, and when the braking operation is canceled, a retracted position of the piston 17 advances, thereby compensating for wear of the brake pads 21 and 22.

When an excessive braking fluid pressure is applied to the piston 17, the adjusting sleeve 19b can not be angularly moved relative to the adjusting spindle 19a, and the adjusting spindle 19a moves forward together with the adjusting sleeve 19b against a spring force of the spring 19d, so that the excessive adjustment is prevented.

The parking-brake operating mechanism (PM) comprises the parking lever 23, and the cam shaft 25. When the parking lever 23 is operated by a brake wire, so that the cam shaft 25 is angularly moved, the pair of thrust transmitting assemblies (TA) are driven. The thrust transmitting assemblies (TA) are formed by a rolling roller 29 for rolling between the cam shaft 25 and a roller plug (curved surface member) 27 provided at an end of the adjusting spindle 19a, a rolling roller 35 (a second rolling roller 35) for rolling between the cam shaft 25 and a roller plug (second curved surface member) 33 provided in a housing 31 (integrally connected to that end of the caliper 13 remote from a rotor), and rolling curved surfaces formed on the cam shaft 25 and the roller plugs 27 and 33, the rolling rollers 29 and 35 rolling on the corresponding rolling curved surfaces.

Each of the roller plugs 27 and 33 is molded of a material which is harder than the housing 31. Each rigid roller plug 27, 33 receives a thrust from the rolling roller 29, 35, and deformation and wear, developing between the rolling roller 29, 35 and the roller plug 27, 33, are suppressed to a minimum so that an axial thrust can be positively transmitted to the adjusting spindle 19a or the housing 31. Even when the size of the rolling rollers 29 and 35 of the thrust transmitting assemblies (TA), as well as the configuration of the rolling curved surfaces, are changed, this can be dealt with merely by exchanging the roller plugs 27 and 33.

The roller plug 33 is retained against angular movement by a pin 37 fixed to a bottom of a cylindrical hole 31a formed in the housing 31. The cylindrical guide (guide member) 39, engaged with the roller plug 33 against angular movement relative thereto, is fixed to the housing 31 against movement relative thereto. Namely, the cylindrical guide 39, inserted in the cylindrical hole 31a, is prevented by the roller plug 33 and a retaining clip 41 from movement in the axial direction, and is also prevented by the roller plug 33 from rotation.

Figure 2:
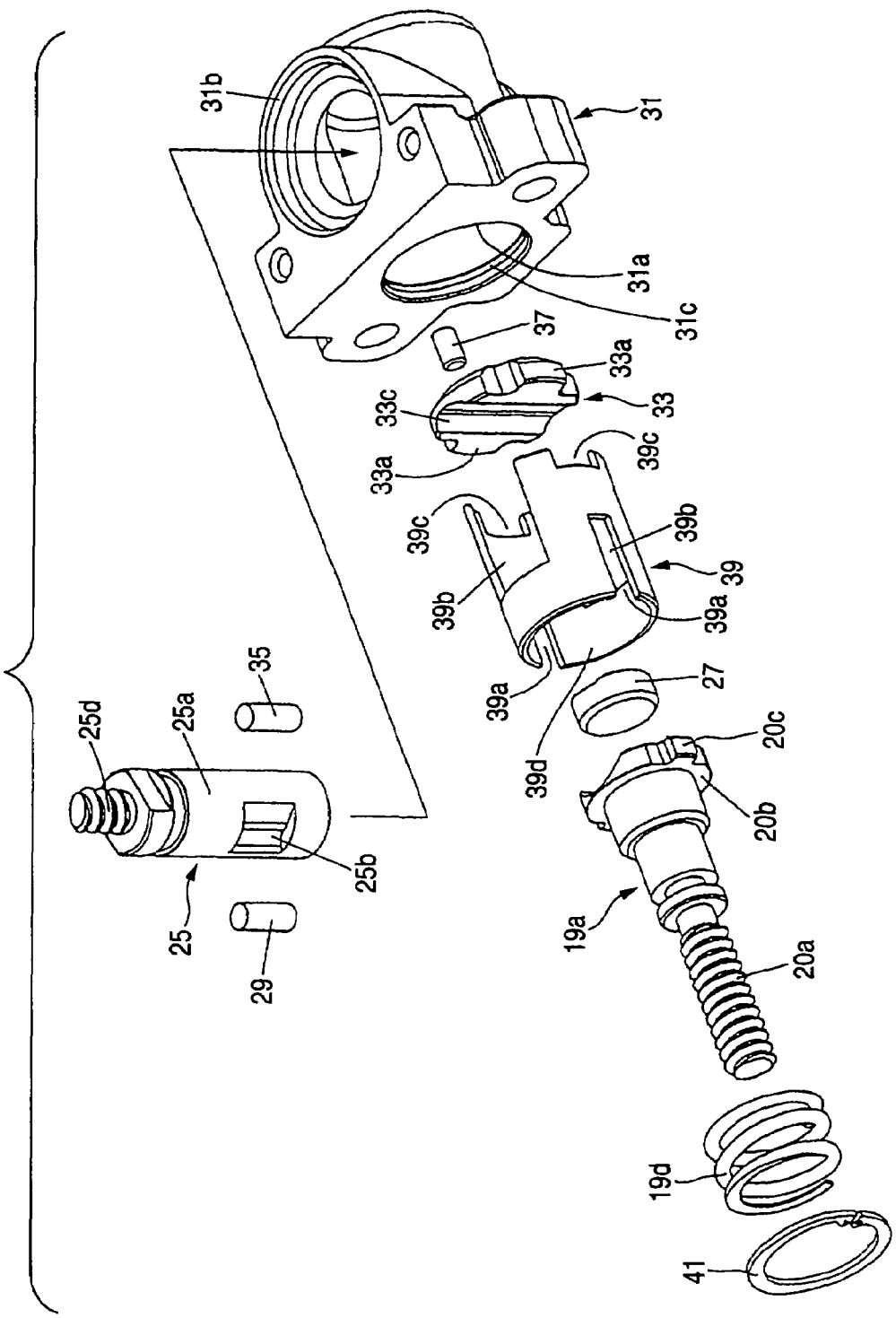
FIG. 2 is an exploded perspective view showing an adjusting spindle, a cylindrical guide and a cam shaft in the parking-brake operating mechanism.

As shown in FIG. 2, the adjusting spindle 19a is supported for sliding movement in a direction of an center axial X-X thereof in such a manner that a head portion 20b of the adjusting spindle 19a is normally urged right (in FIG. 1) into notch guide grooves 39a in the cylindrical guide 39 by the spring 19b. The cam shaft 25 is disposed to extend in a direction perpendicular to the center axis X-X, and is fitted in a pair of notch grooves 39b and 39b (see FIGS. 2 and 4) formed in the cylindrical guide 39, and is supported for sliding movement in the direction of the center axis X-X as is the case with the adjusting spindle 19a. Thus, the cylindrical guide 39 supports the adjusting spindle 19a and the cam shaft 25 in a manner to allow them to slide in the direction of the center axis X-X, and therefore only the cylindrical hole 31a (for receiving the cylindrical guide 39) and a cam shaft insertion port 31b (see FIG. 2) described later need to be formed in the housing 31, and it is not necessary to apply complicated machining and particularly width across flat-machining (which is difficult) to the housing.

Next, details of the constituent parts of the parking-brake operating mechanism, as well as an assembling procedure, will be described with reference to FIGS. 2 to 4.

FIG. 2 is the exploded perspective view showing the adjusting spindle, the cylindrical guide and the cam shaft of the parking-brake operating mechanism. The adjusting spindle 19a includes a reversible screw portion 20a threaded in the adjusting sleeve 19b, and the head portion 20b having a pair of engagement projections 20c which are fitted respectively in the notch guide grooves 39a in the cylindrical guide 39 so as to slide there along. The spring 19d is provided between the head portion 20b and the retaining clip 41 provided at one end of the cylindrical hole 31a formed in the housing 31.

The cylindrical guide 39 has the pair of notch grooves 39b for guiding the sliding movement of the cam shaft 25, and an outer peripheral surface 25a of the cam shaft 25 is supported by the notch grooves 39b, and the sliding movement of the cam shaft 25 in the direction of the center axis X-X is guided by side edges of the notch grooves 39b.

Figure 3:
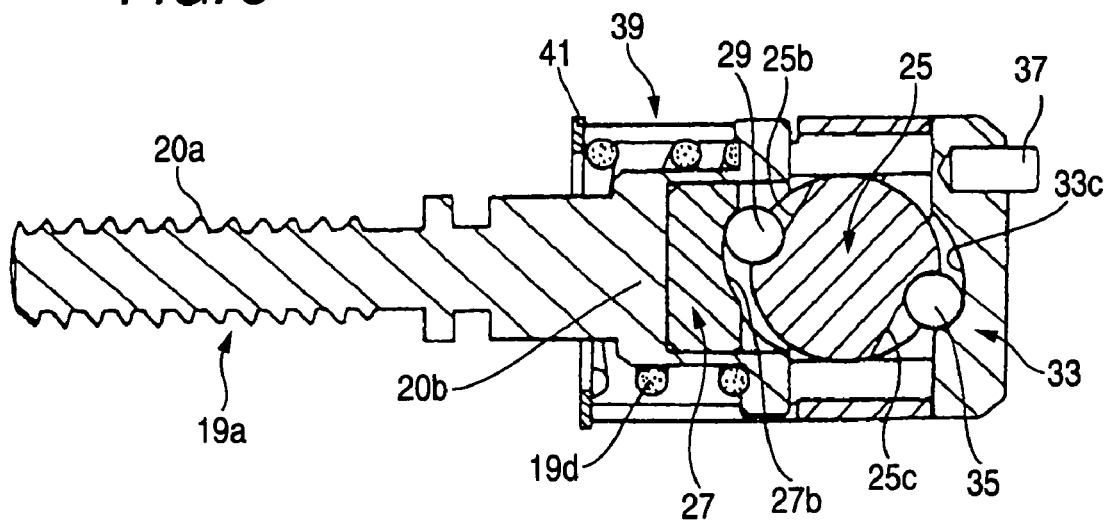
FIG. 3 is a cross-sectional view showing a condition in which the adjusting spindle and the cam shaft of the parking-brake operating mechanism are mounted in the cylindrical guide.

As shown in FIG. 3, the roller plug 27 is fitted in the head portion 20b of the adjusting spindle 19a, and the rolling roller 29 is disposed between the rolling curved surface 25b of the cam shaft 25 and the rolling curved surface 27b of the roller plug 27, and the rolling roller 29 and the rolling curved surfaces 25b and 27b jointly form the first thrust transmitting assembly (TA). On the other hand, the rolling roller (second rolling roller) 35 is disposed between the rolling curved surface (second rolling curved surface) 25c of the cam shaft 25 and the rolling curved surface (second rolling curved surface) 33c of the roller plug 33, and the rolling roller 35 and the rolling curved surfaces 25c and 33c jointly form the second thrust transmitting assembly (TA).

As shown in FIG. 2, retaining grooves 39c and 39c for being retainingly fitted respectively on a pair of retaining projections 33a and 33a formed-on the roller plug 33 are formed in that end portion of the cylindrical guide 39 for engagement with the roller plug 33. The retaining grooves 39c and 39c are fitted respectively on the retaining projections 33a and 33a of the roller plug 33 which is retained by the pin 37 (driven into the bottom of the cylindrical hole 31a) against rotation, and by doing so, the cylindrical guide 39 is fixedly mounted within the cylindrical hole 31a.

With respect to the procedure of assembling the parking-brake operating mechanism, first, the roller plug 33 is fixed to the bottom of the cylindrical hole 31a (formed in the housing 31) by the pin 37, and the adjusting spindle 19a, having the roller plug 27, fitted therein, is inserted into the pair of notch guide grooves 39a and 39a in the cylindrical guide 39, and then the spring 19d is inserted into a cylindrical inner surface 39d of the cylindrical guide 39.

The cylindrical guide 39 is inserted into the cylindrical hole 31a in the housing 31, and in this condition the cam shaft 25 is inserted into the pair of notch grooves 39b and 39b of the cylindrical guide 39 through the insertion port 31b which is formed in the housing 31 in a direction perpendicular to the cylindrical hole 31a in this housing 31. A dimension of the insertion port 31b in the direction of the center axis X-X is slightly larger so that the cam shaft 25 can move in the direction of the center axis X-X.

When inserting the cam shaft 25, the cylindrical guide 39 is pushed toward the bottom of the cylindrical hole 31a so that the rolling roller 29 is held between the rolling curved surface 27b of the roller plug 27 and the rolling curved surface 25b of the cam shaft 25 while the rolling roller 35 is held between the rolling curved surface 33c of the roller plug 33 and the rolling curved surface 25c of the cam shaft 25, and the retaining projections 33a and 33a of the roller plug 33 are fitted respectively in the retaining grooves 39c and 39c of the cylindrical guide 39. Finally, the clip 41 is pressed against the spring 19d to compress the same, and is brought into retaining engagement with a retaining groove 31c (see FIGS. 1 and 2) formed in the inner surface of the cylindrical hole 31a in the housing 31. As a result, the adjusting spindle 19a and the cam shaft 25 are slidably supported by the cylindrical guide 39 fixedly mounted within the cylindrical hole 31a formed in the housing 31, and the two thrust transmitting assemblies (TA) are received in the cylindrical guide 39.

Figure 4:
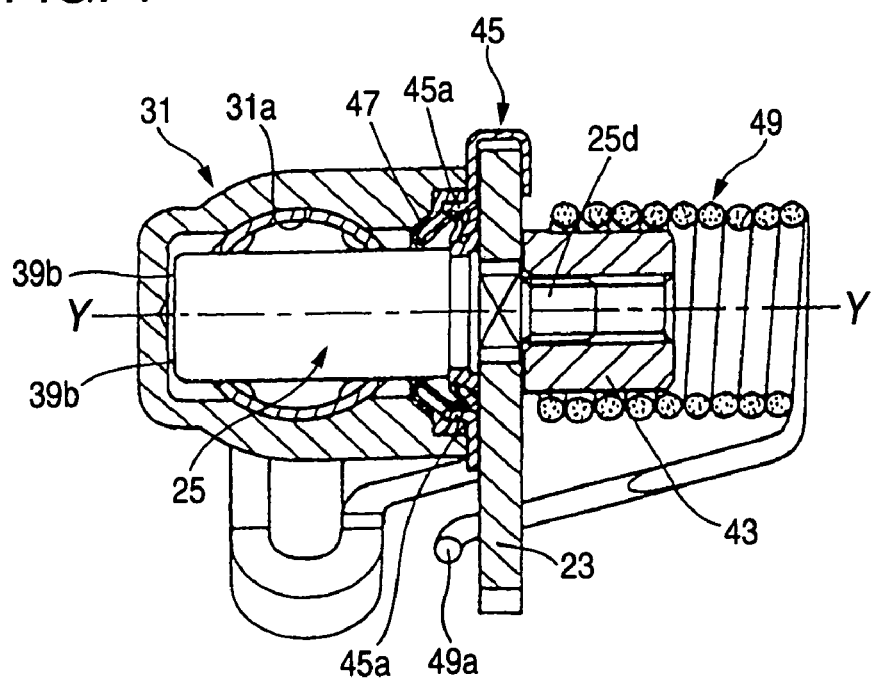
FIG. 4 is a cross-sectional view showing a condition in which the cam shaft and a parking lever of the parking-brake operating mechanism are coupled together.

As shown in FIG. 4, the parking lever 23 for angularly moving the cam shaft 25 about an axis Y-Y thereof is fitted on one end portion of the cam shaft 25. The parking lever 23 is prevented by a nut 43, threaded on a distal end portion 25d of the cam shaft 25, from moving in the direction of the axis Y-Y, and also this parking lever 23 is prevented by a parking lever guide 45, provided at the insertion port 31b formed in the housing 31, from tilting. A dust boot 47 is provided between the cam shaft 25 and the insertion port 31b, and is retained at its inner and outer ends by retaining claws 45a of the parking lever guide 45.

A torsion coil spring 49 is fitted on an outer peripheral surface of the nut 43, and is engaged at one end thereof with the housing 31, and also is engaged at the other end portion 49a thereof with the parking lever 23. After the parking lever 23 is operated, the torsion coil spring 49 functions to always return the cam shaft 25 to its initial position.

Next, the construction and operation of the thrust transmitting assemblies will be described in detail with reference to FIG. 5. FIG. 5A shows the initial position of the cam shaft 25 before the braking operation is effected, and the rolling roller 29 is held between the cam shaft 25 and the roller plug 27 while the rolling roller 35 is held between the cam shaft 25 and the roller plug 35. When the cam shaft 25 is angularly moved left through an angle of 10 degrees from this initial position, the rolling roller 29, while rotating about its axis in such a manner that this rolling roller 29 is held between the rolling curved surface 25b of the cam shaft 25 and the rolling curved surface 27b of the roller plug 27, revolves to a brake operative position of FIG. 5B. Similarly, the rolling roller 35, while rotating about its axis in such a manner that this rolling roller 35 is held between the rolling curved surface 25c of the cam shaft 25 and the rolling curved surface 33c of the roller plug 33, revolves to the brake operative position of FIG. 5B.

The rolling curved surface 25b of the cam shaft 25 is defined by a curved surface with a radius $r_1$ of curvature having its center disposed at a point 01 spaced a distance +e from the axis O of the cam shaft 25 in a direction of an axis y, while the rolling curved surface 25c of the cam shaft 25 is defined by a curved surface with a radius $r_1$ of curvature having its center disposed at a point 02 spaced a distance -e from the axis O of the cam shaft 25 in the direction of the axis y. On the other hand, the rolling curved surface 27b of the roller plug 27 is defined by a curved surface with a radius $r_2$ of curvature having its center disposed at a point near to the point 01, while the rolling curved surface 33c of the roller plug 33 is defined by a curved surface with a radius $r_2$ of curvature having its center disposed at a point near to the point 02.

Thus, the rolling curved surfaces 25b and 25c are made eccentric by the distances +e and -e respectively with respect to the axis O of the cam shaft 25 in the direction of the axis y, and therefore when the cam shaft 25 is angularly moved, the rolling rollers 29 and 35 can be moved in the direction of the center axis X-X. And besides, the curvature centers of the radii r1 and r2 of curvature are disposed close to each other, and therefore lines, which are normal respectively to the curved rolling surfaces 25b and 27b of the cam shaft 25 and the roller plug 27, and pass through the center of the rolling roller 29, generally coincide with each other, while lines, which are normal respectively to the curved rolling surfaces 25c and 33c of the cam shaft 25 and the roller plug 33, and pass through the center of the rolling roller 35, generally coincide with each other as indicated by arrows in FIG. 5B. Therefore, the axial thrust from the cam shaft 25 can be effectively transmitted to the adjusting spindle 19a and the caliper 13.

Figure 6:
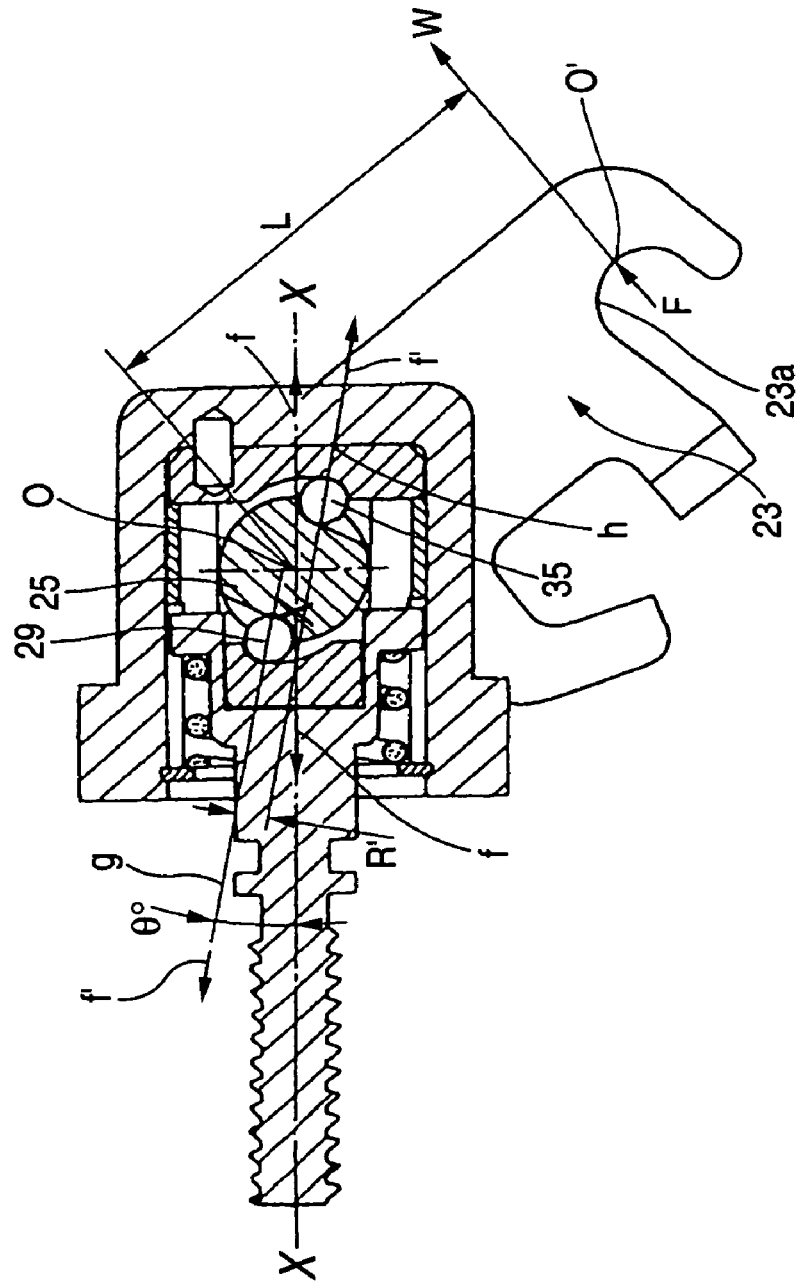
FIG. 6 is a view explanatory of a lever ratio in the parking-brake operating mechanism.

The operation of the thus assembled parking-brake operating mechanism (PM) as well as the lever ratio (boost ratio) will be described with reference to FIGS. 6 to 8.

The brake wire (not shown) is connected to a groove portion 23a formed at one end of the parking lever 23. When this brake wire is pulled in a direction W with a force F applied to a point O', the cam shaft 25 is angularly moved counterclockwise (FIG. 6) about the point (axis) O. At this time, the cam shaft 25, while held in line-contact with each of the rolling rollers 29 and 35, is angularly moved, and therefore a rotational frictional resistance, applied to the cam shaft 25, is small. When an effective length from the point O to the point O' of application of the force F is represented by L, then a rotational torque (T=L×F) develops in the cam shaft 25.

In the initial position of the cam shaft before the braking operation, assuming that an angle between a line g (passing through the center of the rolling roller 29 and a point of contact between the rolling roller 29 and the rolling curved surface 25b of the cam shaft 25) and the center axis X-X, as well as an angle between a line h (passing through the center of the rolling roller 35 and a point of contact between the rolling roller 35 and the rolling curved surface 25c of the cam shaft 25) and the center axis X-X, is represented by θ and that the distance between the lines g and h is represented by R, the rotational torque L×F is converted into R×f' (Here, f' represents a force exerted in the directions of lines g and h). The axial thrust f is expressed by the formula, f=f' cos θ, and therefore the lever ratio (boost ratio) M of the parking-brake operating mechanism (PM) is expressed by the formula, M=f/F=(L/R)×cos θ.

Figure 8:
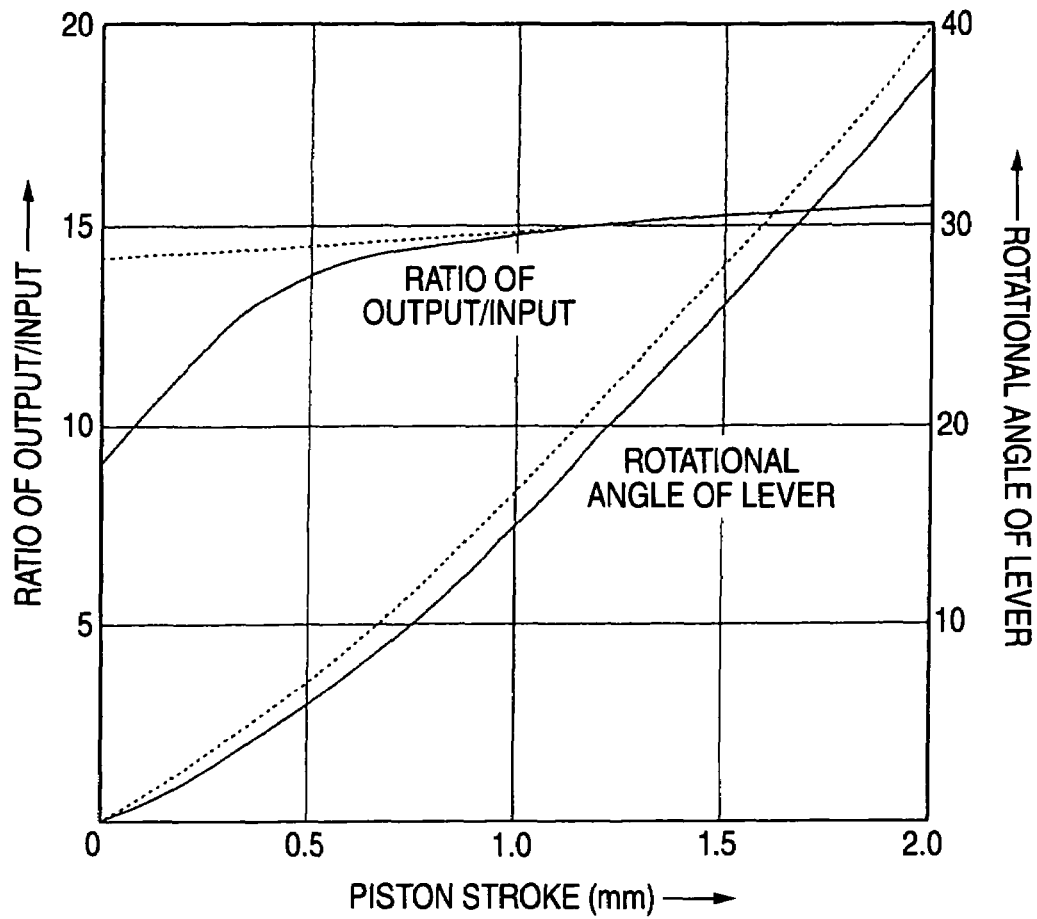
FIG. 8 is an illustration showing the lever ratio and the rotational angle of the cam shaft relative to the stroke change of the adjusting spindle.

In the parking-brake operating mechanism, a desk study indicates that the lever ratio and a stroke change of the adjusting spindle 19a relative to the amount of pivotal movement of the parking lever vary at rates shown in FIG. 8.

Figure 7A:
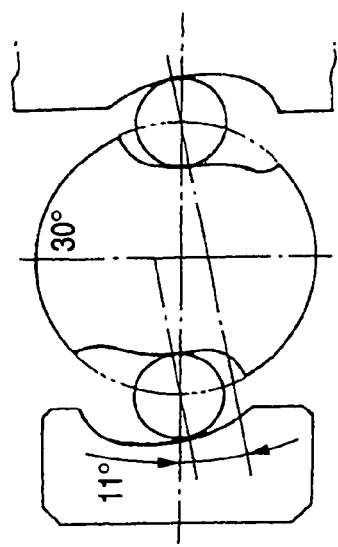
FIG. 7A is a view showing an operating condition of the parking-brake operating mechanism obtained through a desk study, explaining the lever ratio and a stroke change of the adjusting spindle relative to the rotational angle of the cam shaft, at an initial condition.

FIG. 7A shows the initial condition at the time of starting the braking operation. When the diameter of each of the rolling rollers 29 and 35 is 5.0 mm, an initial input value of the distance R is 3.2 mm, an initial value of the inclination angle θ of each of the lines g and h relative to the center axis X-X is 10 degrees, and the effective length L of the parking lever 23 is 45 mm, a calculated value of the lever ratio ((45/3.2)×cos θ 10°) is about 13.8

Figure 7B:
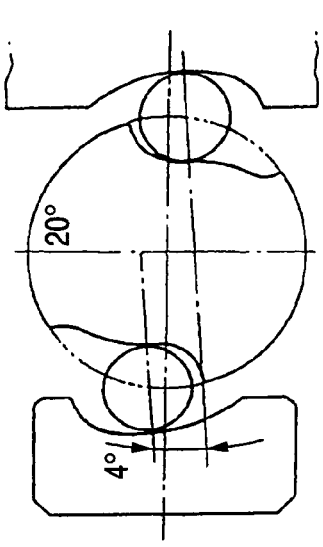
FIG. 7B is a view showing an operating condition of the parking-brake operating mechanism obtained through a desk study, explaining the lever ratio and a stroke change of the adjusting spindle relative to the rotational angle of the cam shaft, at a condition in which the cam shaft is angularly moved 10 degrees by the parking lever.
Figure 7D:
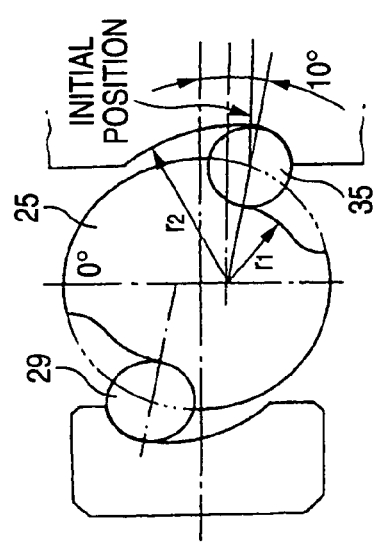
FIG. 7D is a view showing an operating condition of the parking-brake operating mechanism obtained through a desk study, explaining the lever ratio and a stroke change of the adjusting spindle relative to the rotational angle of the cam shaft, at a condition in which the cam shaft is angularly moved 30 degrees.
Figure 7C:
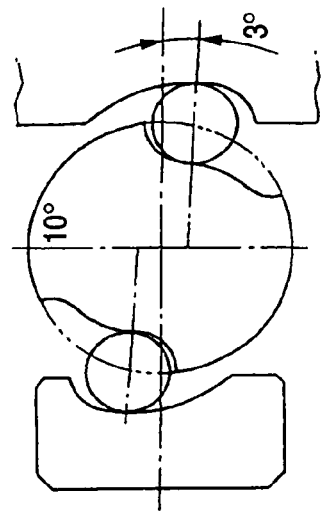
FIG. 7C is a view showing an operating condition of the parking-brake operating mechanism obtained through a desk study, explaining the lever ratio and a stroke change of the adjusting spindle relative to the rotational angle of the cam shaft, at a condition in which the cam shaft is angularly moved 20 degrees.

FIG. 7B shows the condition in which the cam shaft 25 is angularly moved left 10 degrees from the initial position by operating the parking lever 23, and FIG. 7C shows the condition in which the cam shaft is angularly moved 20 degrees, and FIG. 7 shows the condition in which the cam shaft is angularly moved 30 degrees.

In this embodiment, the stroke in the axial direction gradually increases at a generally constant rate with the increase of the rotational angle of the cam shaft as indicated by a broken line in FIG. 8, and therefore brake-feeling characteristics are good, and besides within the range of actual use, the lever ratio can always be kept to a stable condition (around 15) regardless of the angle of angular movement of the cam shaft.

Figure 9:
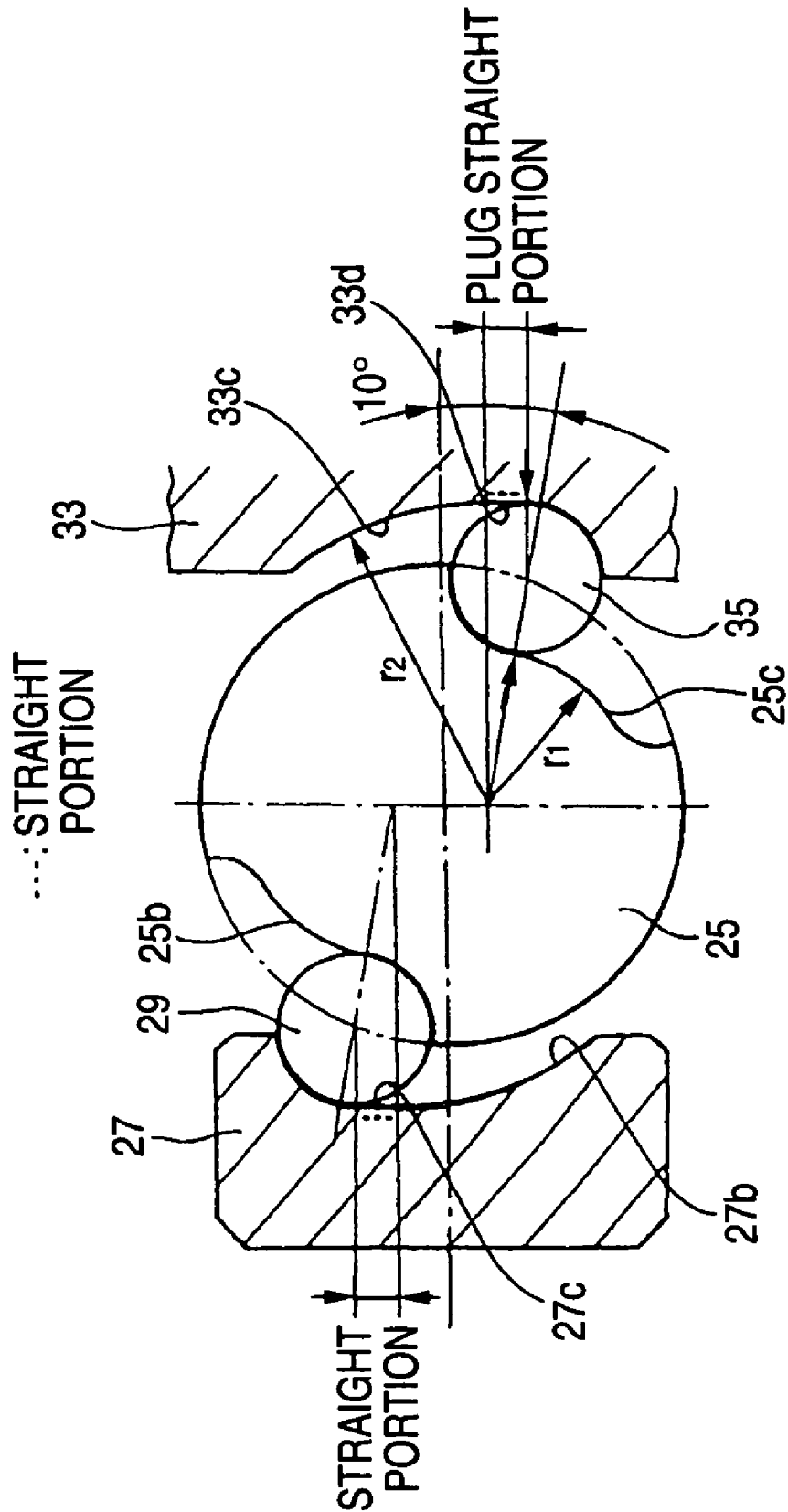
FIG. 9 is a cross-sectional view showing an important portion of thrust transmitting members in a second embodiment of the invention.

FIG. 9 shows a second embodiment of the invention, in which those constituent parts which are identical in function to those of the first embodiment are designated by identical reference numerals, respectively. The second embodiment differs from the first embodiment only in that stroke areas of rolling curved surfaces 27b and 33b of plugs 27 and 33 (with which a cam shaft 25 is contacted at an initial stage of angular movement of the cam shaft 25) are formed or defined by straight portions 27c and 33c (a straight portion 27c , a second straight portion 33c ), respectively, as shown in FIG. 9. With this construction, a stroke can be produced quickly at the initial stage of angular movement of the cam shaft 25, and although the lever ratio is slightly reduced as indicated in a solid line in FIG. 8, the stroke amount at the initial stage of angular movement of the cam shaft 25 can be increased as indicated in a solid line in FIG. 8.

Further, the straight portions 27c and 33c should not be formed straight, but can be formed substantially straight. That is, the straight portions 27c and 33c include curved surfaces with large curvature radiuses so that the rolling rollers moves substantially straight in the initial stage of angular movement of the cam shaft.

Figure 10:
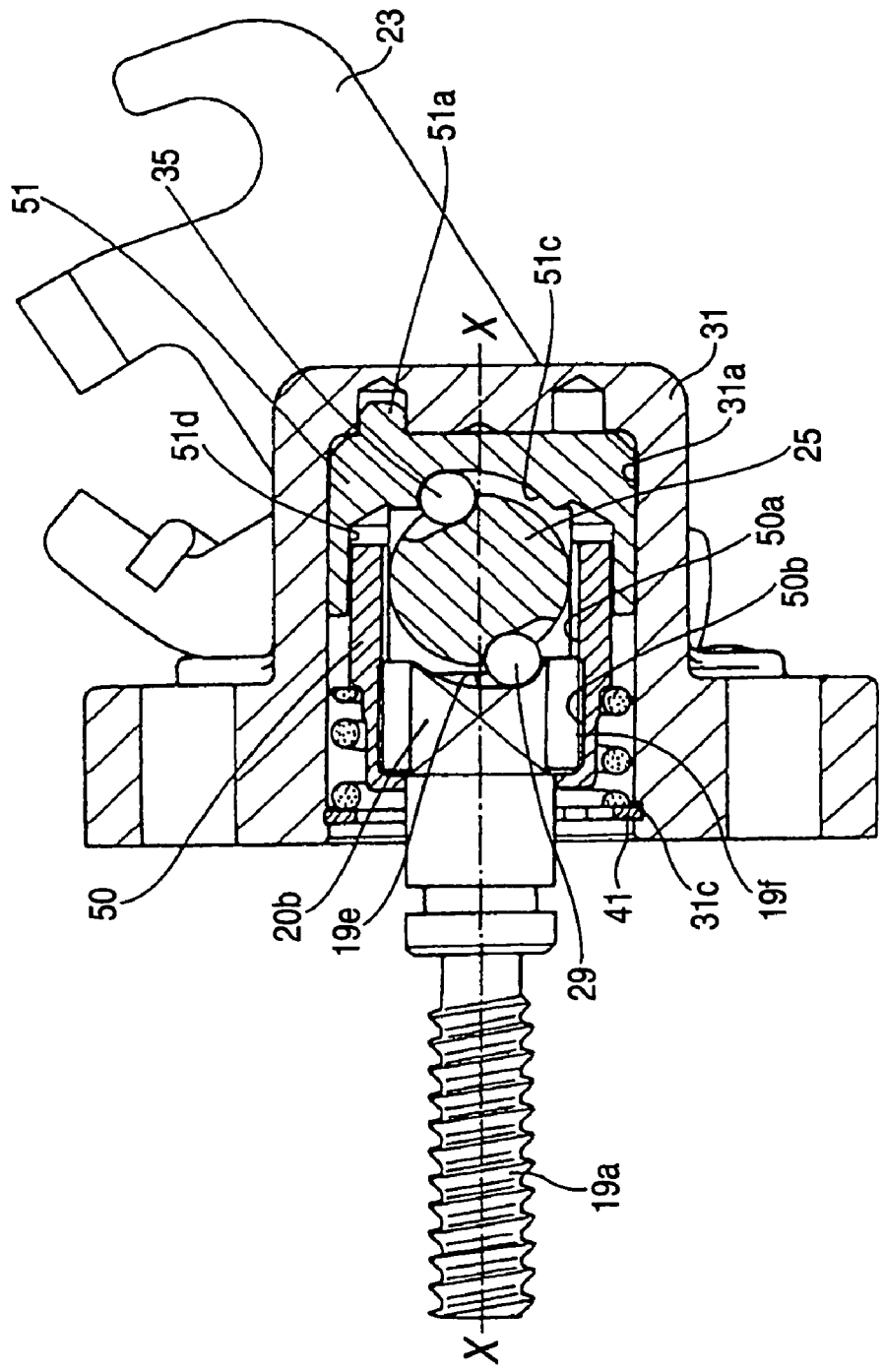
FIG. 10 is a cross-sectional view of an important portion of a third embodiment of a disc brake actuating apparatus of the invention provided with a parking-brake operating mechanism.
Figure 11:
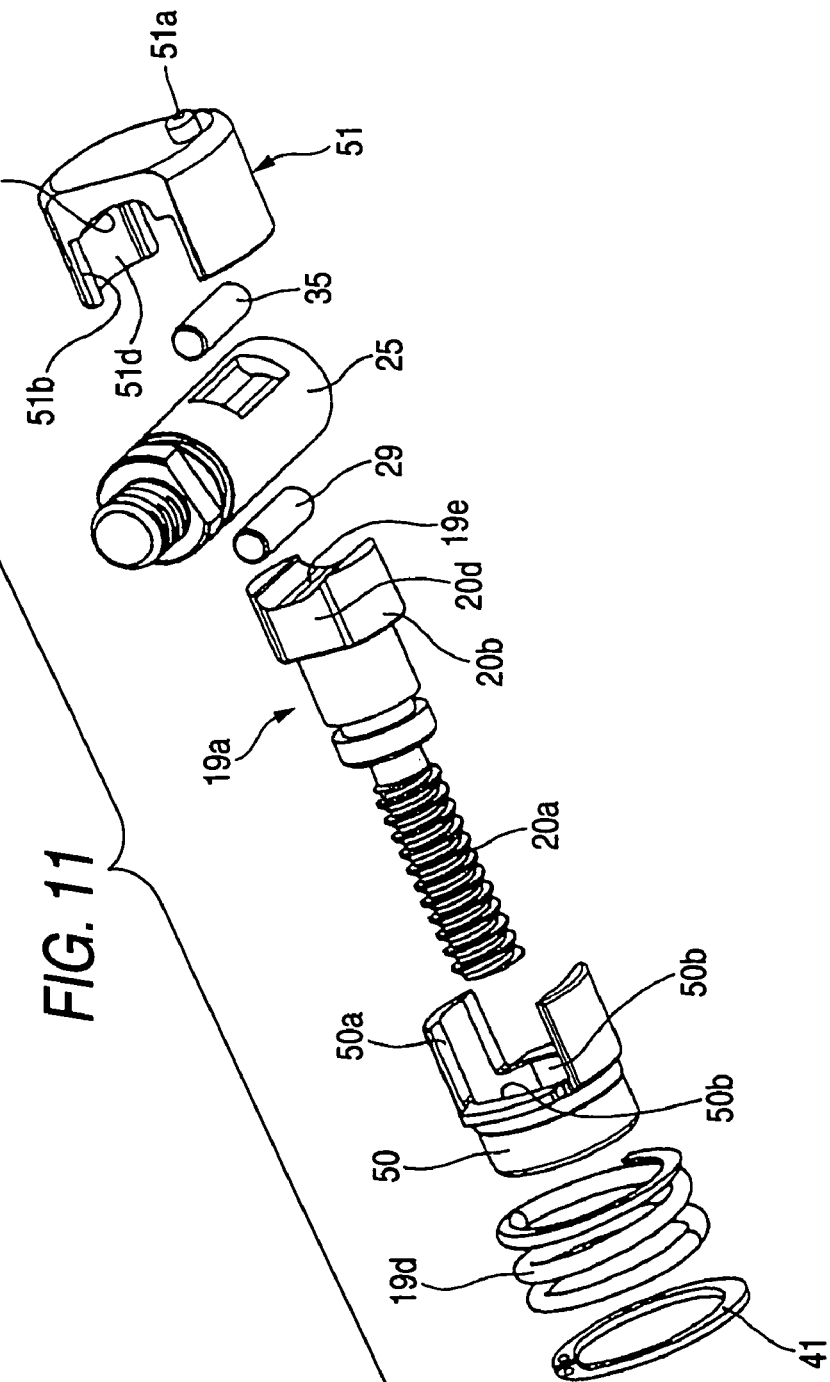
FIG. 11 is an exploded perspective view showing an adjusting spindle, a guide and a cam shaft in the parking-brake operating mechanism of the third embodiment.
Figure 12:
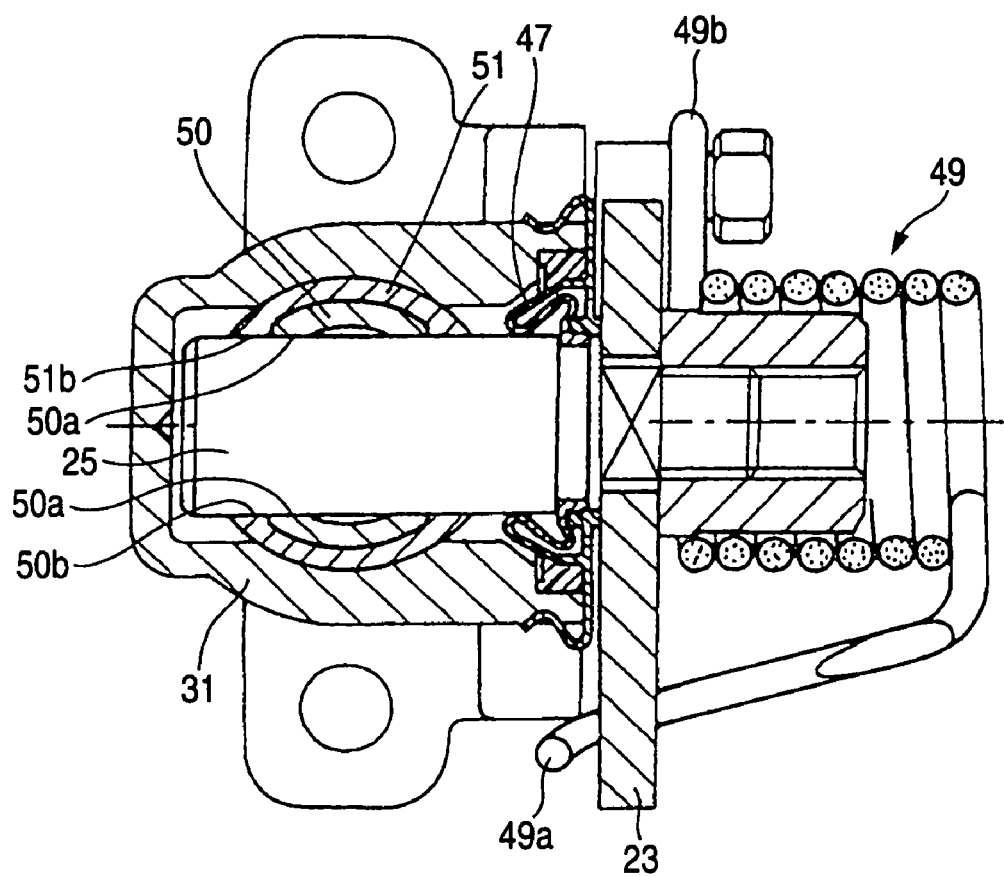
FIG. 12 is a cross-sectional view showing a condition in which the cam shaft and a parking lever of the parking-brake operating mechanism are coupled together.
Figure 13:
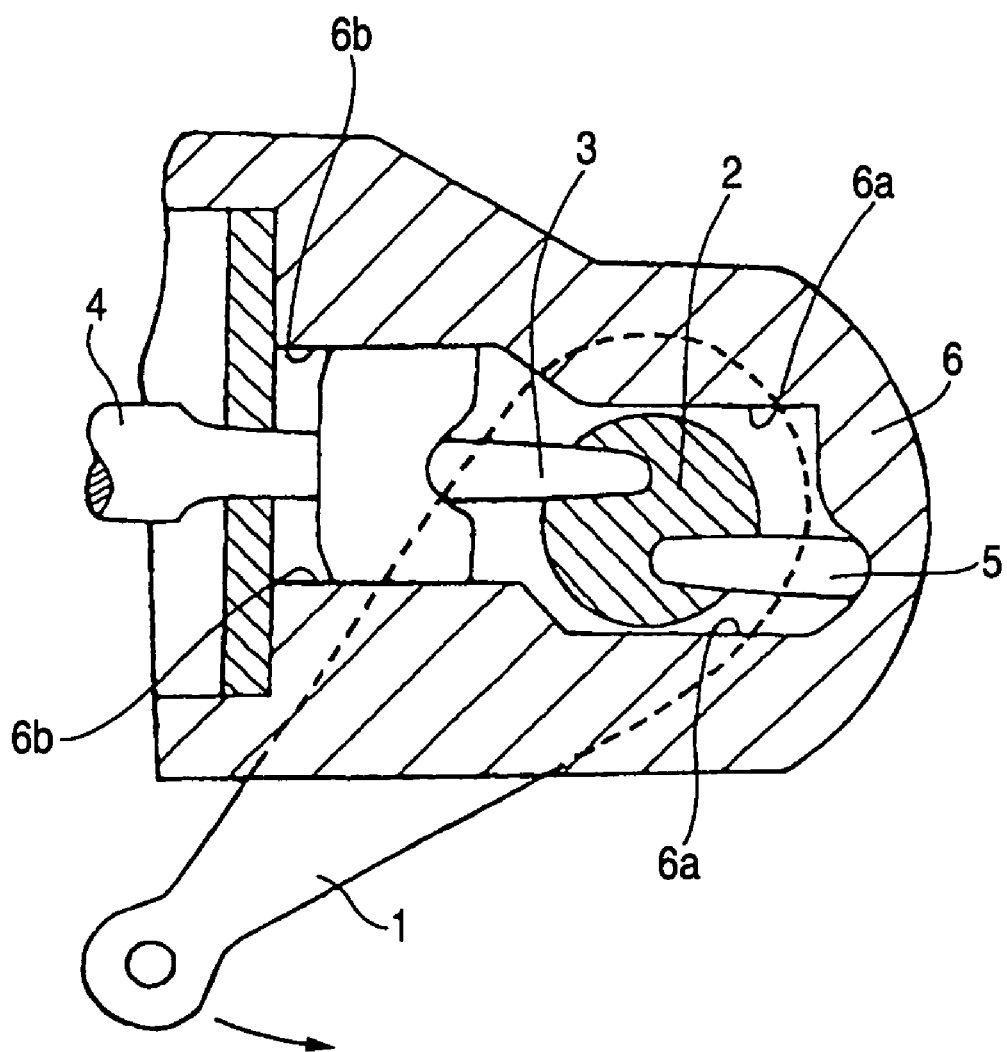
FIG. 13 is a cross-sectional view of a portion of a conventional parking-purpose operating mechanism.

FIGS. 10 to 12 show a third embodiment of the invention, in which those constituent parts which are identical in function to those of the first embodiment are designated by identical reference numerals, respectively.

As shown in FIG. 10, thrust transmitting assemblies and an operating mechanism thereof are formed by a rolling roller 29 for rolling between the cam shaft 25 and a head portion 20b of the adjusting spindle 19a, a rolling roller 35 for rolling between the cam shaft 25 and the guide 51 provided in a housing 31 (integrally connected to that end of a caliper 13 remote from a rotor), and rolling curved surfaces 19e and 51c formed on the cam shaft 25, the head portion 20b of the adjusting spindle 19a and the guide 51, the rolling rollers 29 and 35 rolling on the corresponding rolling curved surfaces.

A projection 51a, formed on a bottom surface of the guide 51, is fitted in a hole formed in a bottom of a cylindrical hole 31a in the housing 31, thereby retaining the guide 51 against rotation. The guide 51 has notch grooves 51b and 51b, and a retainer 50 also has notch grooves 50a and 50a. The retainer 50 is fitted in an inner peripheral surface 51d of the guide 51 in such a manner that the notch grooves 51b are disposed in registry with the notch grooves 50a (FIG. 12).

The cam shaft 25 is fitted in the notch grooves 50a and 51b (disposed in registry with each other), and is supported for sliding movement in a direction of a center axis X-X of the adjusting spindle 19a. Reference numeral 49b denotes an end portion of a torsion coil spring 49 which is engaged with the housing 31 (FIG. 12).

As shown in FIG. 11, width across flats 20d and 20d are formed on the head portion 20b of the adjusting spindle 19a, and are engaged with width across flats 50b and 50b of the retainer 50, respectively. Therefore, by the retainer 50 (which is prevented by the cam shaft 25 from rotation) and the width across flats 50b and 20d engaged with each other, the adjusting spindle 19a is prevented from rotation. An urging force of a spring 19d , held in a compressed condition by a retaining clip 41 retainingly engaged in a retaining groove 31c in the housing 31, is transmitted to the adjusting spindle 19a via the retainer 50, thus urging the adjusting spindle 19a in a direction away from the rotor. Arcuate outer surfaces 19f of the head portion 20b of the adjusting spindle 19a are fitted respectively in arcuate inner surfaces of the retainer 50.

Although the preferred embodiments of the invention have been described above with reference to the drawings, the construction of the invention is not limited to these embodiment. For example, although the invention is applied to the floating caliper type disc brakes, the invention can be applied also to a fixed caliper type disc brake, in which case a thrust transmitting assembly can be provided only between a cam shaft and an adjusting spindle. The roller plugs are made of the rigid material, and therefore these roller plugs are separate from the adjusting spindle and the housing. However, the roller plugs do not always need to be provided, and the rolling curved surfaces can be formed directly on the adjusting spindle and the housing, respectively.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A disc brake actuating apparatus comprising:

a caliper;

a piston slidably supported by the caliper and containing an adjuster mechanism; and a parking-brake operating mechanism provided at one end portion of the caliper, wherein the parking-brake operating mechanism includes:

an adjusting spindle of the adjuster mechanism;

a cam shaft disposed perpendicularly to the adjusting spindle;

a parking lever connected to one end of the cam shaft; and a first thrust transmitting assembly disposed between the cam shaft and the adjusting spindle, wherein the first thrust transmitting assembly transmits an axial thrust to the adjusting spindle when the cam shaft is angularly moved, a second thrust transmitting assembly provided between the cam shaft and the caliper on a side of the cam shaft facing away from a rotor, and wherein the first thrust transmitting assembly includes:

a first rolling roller that rolls between the cam shaft and the adjusting spindle, while the first rolling roller rotates about its axis; and first rolling curved surfaces provided respectively at the cam shaft and the adjusting spindle, wherein the first rolling roller is cylindrical, and is disposed in contact with the first rolling curved surfaces, wherein the second thrust transmitting assembly includes:

a second rolling roller that rolls between the cam shaft and the caliper, while the second rolling roller rotates about its axis; and second rolling curved surfaces provided respectively at the cam shaft and the caliper, wherein the second rolling roller is cylindrical, and is disposed in contact with the second rolling curved surfaces, wherein the first rolling curved surface on the cam shaft and the second rolling curved surface on the cam shaft are arranged symmetrically with respect to a rotating axis of the cam shaft, wherein a center of curvature of the first rolling curved surface of the cam shaft is spaced a predetermined distance from the rotating axis of the cam shaft, a center of curvature of the second rolling curved surface of the cam shaft is spaced the predetermined distance from the rotating axis of the cam shaft, the center of curvature of the first rolling curved surface is spaced the predetermined distance from the rotating axis in a first direction, and the center of curvature of the second rolling curved surface is spaced the predetermined distance from the rotating axis in a second direction opposite to the first direction.

2. The disc brake actuating apparatus according to claim 1, wherein a center of curvature of the first rolling curved surface provided at the adjusting spindle is disposed close to a center of curvature of the first rolling curved surface on the cam shaft, and a center of curvature of the second rolling curved surface provided at the caliper is disposed close to a center of curvature of the second rolling curved surface formed on the cam shaft.

3. The disc brake actuating apparatus according to claim 2, wherein the first rolling curved surface provided at the adjusting spindle includes a straight portion provided in an area corresponding to an initial stage of angular movement of the cam shaft, and the second rolling curved surface provided at the caliper includes a second straight portion provided in the area corresponding to the initial stage of the angular movement of the cam shaft.

4. The disc brake actuating apparatus according to claim 2, further comprising a curved surface member mounted on the adjusting spindle, wherein the first rolling curved surface provided at the adjusting spindle is formed on the curved surface member.

5. The disc brake actuating apparatus according to claim 2, further comprising a curved surface member mounted on the caliper, wherein the second rolling curved surface provided at the caliper is formed on the curved surface member.

6. The disc brake actuating apparatus according to claim 1, further comprising:

a cylindrical hole having an axis extending in a direction of an axis of the adjusting spindle;

an insertion port has an axis perpendicular to the axis of the cylindrical hole; and a guide member fixedly mounted within the cylindrical hole, wherein the cam shaft is inserted through the insertion port and slidably supported by the guide member.

7. The disc brake actuating apparatus according to claim 6, wherein the cam shaft is slidably supported in a pair of notch grooves formed in a cylindrical portion of the guide member.

8. The disc brake actuating apparatus according to claim 6, further comprising:

a dust boot is provided between the insertion port and the cam shaft; and a parking lever guide, provided at the one side of the cam shaft, for preventing the parking lever from being tilted, wherein the dust boot is retained by the parking lever guide.

9. The disc brake actuating apparatus according to claim 1, wherein the caliper includes a housing connected to a side of the caliper remote from the rotor, and the adjusting spindle, the thrust transmitting assembly and the cam shaft are assembled together in a generally unitary manner within the housing.

* * * * *